United States Patent [19]

Cerny et al.

[11] 4,208,317

[45] * Jun. 17, 1980

[54] FLAMEPROOFED PLASTIC COMPOSITIONS

[75] Inventors: Jacqueline Cerny; Gilbert Vivant, both of Lyons, France

[73] Assignee: Rhone-Poulenc Industries, Paris, France

[*] Notice: The portion of the term of this patent subsequent to May 30, 1995, has been disclaimed.

[21] Appl. No.: 889,333

[22] Filed: Mar. 23, 1978

Related U.S. Application Data

[63] Continuation of Ser. No. 690,845, May 28, 1976, abandoned.

[30] Foreign Application Priority Data

Jun. 10, 1975 [FR] France .............................. 75 18040

[51] Int. Cl.$^2$ .......................... C08L 61/10; C08K 3/02
[52] U.S. Cl. ................................. 260/38; 260/37 N; 260/37 EP; 260/37 SB; 260/39 R; 260/40 R; 260/42.18; 260/42.46; 260/42.49; 260/42.52; 260/45.7 P; 260/DIG. 24
[58] Field of Search .................. 260/14, 37 EP, 37 N, 260/38, 42.14, 42.56, 45.7 P, 824 R, 827, 830 R, 830 P, 831, 834, 835, 836, 840, 841, 842, 844, 845, 846, 847, 848, 850, 851, 854, 857 R, 858, 859 R, 860

[56] References Cited

U.S. PATENT DOCUMENTS

| | | | |
|---|---|---|---|
| 3,336,155 | 8/1967 | Rowe | 428/407 |
| 3,386,851 | 6/1968 | Harlan | 427/221 |
| 3,477,982 | 11/1969 | Dijkstra et al. | 260/37 EP |
| 3,627,780 | 12/1971 | Bonnard et al. | 260/326.3 |
| 3,691,195 | 9/1972 | Sambeth et al. | 260/326.3 |
| 3,847,861 | 11/1974 | Largman et al. | 260/40 R |
| 3,883,475 | 5/1975 | Racky et al. | 260/45.75 E |
| 3,897,586 | 7/1975 | Coker | 428/407 |
| 3,962,491 | 8/1976 | Sato et al. | 427/221 |

OTHER PUBLICATIONS

Kirk–Othmer; Encyclopedia of Chemical Technology; 2nd ed.; vol. 13; 1967; pp. 440, 441, 443.
Condensed Chemical Dictionary; 5th ed.; 1956; p. 619.
Knapsack; Chemical Abstracts; 71, 50805c; 1969.
Vollbracht; Chemical Abstracts; 72, 112687x; 1970.
Dany et al.; Chemical Abstracts; 75, 118977a; 1971.
Whitehouse; Phenolic Resins; 1968; p. 56.

*Primary Examiner*—Lewis T. Jacobs
*Attorney, Agent, or Firm*—McDougall, Hersh & Scott

[57] ABSTRACT

Compositions for the flameproofing of plastics, said compositions containing from 0.1% to 20% by weight, relative to the plastic, of red phosphorus in the form of particles having a mean diameter less than 200μ, encapsulated in a polymer which does not have a melting point or softening point below 90° C., and which has a molecular weight greater than 2,000.

6 Claims, No Drawings

FLAMEPROOFED PLASTIC COMPOSITIONS

This is a continuation of application Ser. No. 690,845, filed May 28, 1976, now abandoned.

The present invention relates to compositions based on plastics flameproofed by means of encapsulated red phosphorus.

Numerous patents are concerned with the use of red phosphorus for flameproofing plastics; red phosphorus is in effect a very good flameproofing agent. For a given activity, it is necessary to use much smaller amounts of phosphorus than, for example, halogen derivatives.

Furthermore, its use results in better mechanical properties and does not interfere with the electrical properties of the plastics in which it is incorporated.

However, this application is restricted by the dangers encountered, such as pollution hazards, and difficulties in using the material with full safety. In fact, the presence of traces of water, present in practically all the polymers, under the action of the heat required to form these polymers, results in the formation of phosphine, which is very toxic and which ignites spontaneously in air.

German Pat. No. 2,308,104 describes compositions of thermoplastics flameproofed by a red phosphorus and containing metal oxides to prevent evolution of phosphine in the course of storage at ambient temperature.

Belgian Pat. No. 817,020 teaches that if the use is made of polyolefin compositions flameproofed with a mixture of red phosphorus and a nitrogen-organic compound which carbonizes on exposure to a flame, evolution of phosphine takes place between 170° C. and 230° C. To reduce this evolution, the said patent describes the use of stabilizers based on amidosulphonic acid, on a paraffin oil, silicone oil, or pentaerythritol.

It was desirable and it is an object of this invention to find a simple means which makes use of the compositions in the complete absence of an evolution of phosphine, especially where the plastics are intended for the production of shaped articles.

It has been found, in accordance with the practice of this invention, that plastic compositions can be flameproofed when such plastic compositions are formulated to contain from 0.1% to 20% by weight, relative to the plastic, of red phosphorus in the form of particles having a mean diameter of less than 200μ, and encapsulated in a polymer which does not have a melting point or softening point below 90° C. and has a mean molecular weight greater than 2,000.

Many plastics serve as the basis for compositions for producing shaped articles which, very frequently, must be flame-proofed.

Amongst the thermoplastics there may be mentioned the polyolefins, such as high or low density polyethylenes, polypropylene, polyfluoroethylenes and ethylene-propylene copolymers, the polyvinyl compounds, such as polyvinyl chlorides and vinyl chloride copolymers; the polystyrenes and acrylonitrile-butadienestyrene copolymers; the polyamides, such as poly(hexamethylene adipamide), poly(hexamethylene azelamide), poly(hexamethylene dodecanediamide), polycaprolactam, poly(hexamethylene sebacamide), polylauryllactam and polyundecanamide; the saturated polyesters, such as poly(ethylene glycol terephthalates) or poly(butylene glycol terephthalates); the polycarbonates; the polyacetals; the polyacrylic compounds, such as poly(methyl methacrylate); the cellulose esters; polyurethanes, and the polyamide-imides.

Amongst the thermosetting polymers there may be mentioned the phenolic resins, the aminoplasts and the unsaturated polyesters.

Various elastomers can also be flameproofed according to the invention, for example natural or synthetic rubbers, silicones and polyurethanes.

The compositions based on plastics can contain reinforcing fillers, such, for example, as glass fibers; fillers intended to impart specific characteristics to the shaped articles, such, for example, as self-lubricating fillers, or inert fillers such, for example, as kaolin or talc.

Numerous adjuvants can also be introduced into the compositions such, for example, as anti-oxidants, heat stabilizers or light stabilizers, dyestuffs or pigments.

Red phosphorus is to be understood to include all the colored allotropic varieties, which are sold commercially under the name red phosphorus and which may contain up to 3% of metal oxides or metal salts as stabilizers.

The red phosphorus is used in the form of particles having a mean diameter less than 200μ and preferably less than 100μ.

These particles are encapsulated in a polymer selected in such a way that at the molding temperature of the flame-proofed composition, the encapsulating layer undergoes a minimum of degradation.

It will be assumed herein that the polymers intended for the coating must be film-forming, that is to say must form a continuous film at the surface of the phosphorus particles.

The choice of the coating polymer is guided by the nature of the plastic material to be flameproofed and by its molding temperature.

The term molding temperature is applied to the temperature or temperature level appropriate for processing a given plastic. This temperature depends not only on the nature of the plastic and the conversion technique but also on the apparatus used and, to a lesser degree, on the formulation employed.

The polymers suitable for the encapsulation of red phosphorus, in accordance with the invention, must not have a melting point or softening point below 90° C. Amongst the polymers which do not have a melting point or softening point, it is preferred to make use of polymers having degradation temperature above 150° C.

Depending on the compositions to be flameproofed, various polymers may be suitable, such as the polycarbonates, the polyamides, the polyesters, the polyolefins, the polymers derived from acrylic acid or acrylates, the polytetrafluoro-ethylenes, the silicone resins, the polyimide-amides, the melamine-formaldehyde resins, the phenolic resins, the epoxy resins and the polyimides.

These polymers can be deposited on the surface of the phosphorus particles by numerous encapsulation processes such as those described in the "Encyclopedia of Polymer Sciences and Technology", Vol. 8, page 719 et seq., from Interscience Publishers. These processes are essentially of a chemical or physical nature. Amongst the commonest processes, there may be mentioned coacervation in an aqueous phase, or interfacial coacervation, precipitation in an organic phase by addition of a non-solvent, spray-drying, the use of a fluidized bed, interfacial polymerization or polymerization in situ in the vapor phase or in a wet phase, vacuum deposition, electrostatic deposition as well as numerous other processes based on methods of phase separation or of interfacial reactions.

In order that the protection provided by the coating polymer shall be satisfactory, the amount of polymer used is preferably between 5% and 80% by weight relative to the red phosphorus.

It is known furthermore that the addition of metal oxides or metal salts, usually present in small amounts in commercial red phosphorus, stabilizes red phosphorus. The addition of metal oxides, which makes it possible to suppress possible evolution of phosphine, is included within the scope of the invention.

The metal oxides which give the best results in use are the oxides of copper, zinc, silver, iron, tin, vanadium, antimony, magnesium or titanium, but preferably copper oxide.

The amounts of metal oxides used can vary depending on the amount of polymer used, the molding conditions of the plastics, as well as their nature.

Usually, up to 100% by weight of metal oxide, relative to the coated red phosphorus, can be employed.

The use of encapsulated particles of red phosphorus offers numerous advantages, including the ease of handling before and during the introduction into polymer compositions, the reduction in the pollution hazards in the course of the preparation of the compounds and, above all, the absence of an evolution of phosphine during use, particularly when working at temperatures above 200° C.

In Examples 1 to 11, given by way of illustration and not by way of limitation, a polyamide 6,6 has been selected as the polymer to be flameproofed; its moisture absorption is, with the exception of the cellulosics, amongst the highest values exhibited by polymers and, under the action of heat and in the presence of red phosphorus, leads to the greatest evolution of phosphine.

EXAMPLE 1

A 24% by weight solution in N-methyl-pyrrolidone (NMP) of a polyamide-imide, prepared by condensation of trimellitic anhydride and 4,4'-diisocyanatodiphenylmethane in stoichiometric proportions, is used. The polymer has a reduced viscosity of 90 cm$^3$/g (0.5% by weight solution in N-methyl-pyrrolidone). 166.7 g of this solution are diluted with 100 cm$^3$ of NMP and 60 g of a red phosphorus powder having a mean particle size of 20 to 30$\mu$ are added with stirring.

4 liters of water are placed in a 5 liter vessel equipped with a turbine (stirrer) revolving at 2,800 rpm. The dispersion of red phosphorus obtained above is poured in while stirring, and the mixture is stirred for 2 hours. It is filtered and the retained material is then washed with 200 cm$^3$ of methanol. Thereafter it is rinsed with twice 200 cm$^3$ of ether and dried at 50° C. 98.4 g of encapsulated red phosphorus are obtained.

30 g of the coated red phosphorus and 300 g of poly(hexamethylene adipamide), having a mean molecular weight of 20,000 and an inherent viscosity, in meta-cresol, of 1.3, are introduced into a jacketed one liter autoclave equipped with a spiral scraper-type stirrer revolving at 20 rpm and heated by a heating fluid. The mixture is heated gradually, while stirring, so as to reach a temperature of 285° C. after one hour. It is maintained at this temperature for 1 hour.

To determine the phosphine which may be evolved, the gases leaving the autoclave are trapped in two 1,000 cm$^3$ flasks in series, containing 750 cm$^3$ of a 2% aqueous solution of mercuric chloride, and the acid formed is determined in the presence of methyl orange. This method of determination has been described by Wilmet in "Compte-rendus de l'Academie des Sciences" 185 (1927), page 206.

The weight of phosphine evolved is 17.5 mg per 1 g of red phosphorus employed.

A blank experiment carried out under the same conditions but with uncoated red phosphorus, instead of the coated red phosphorus (18g) gives an evolution of phosphine of A 33.5 mg per gram of red phosphorus employed.

Slabs are produced from the polyamide/encapsulated red phosphorus composition and from the polyamide alone, by cold sintering under a pressure of 300 kg/cm$^2$. These slabs have the following size: 100 mm long, 6 mm wide and 3 mm thick.

The limiting oxygen index is measured (by the LOI test in accordance with standard specification ASTM D 2863).

The following results are obtained:

|  | LOI test |
|---|---|
| Polyamide alone | 20.8 |
| Polyamide + red phosphorus | 26 |

EXAMPLE 2

24 g of a polycarbonate of bisphenol A, having a mean molecular weight of 33,000 and a glass transition temperature of 145° C., are dissolved in 150 cm$^3$ of chloroform. 36 g of a red phosphorus powder having a mean particle size of 20 to 30$\mu$ are added while stirring.

This suspension is stirred for 15 minutes. It is then poured into 3 liters of methanol, as in Example 1. After filtering, rinsing with ether and drying, 59 g of encapsulated red phosphorus powder are obtained.

Thereafter, the procedure in Example 1 is followed.

An evolution of phosphine of 2.7 mg per gram of red phosphorus was obtained.

The LOI test is carried out as in Example 1.

The following results are obtained for the polyamide composition with red phosphorus coated with polycarbonate: 25.5–26.

EXAMPLE 3

400 cm$^3$ of ortho-dichlorobenzene, followed by 22 g of pyrocatechol, 30 cm$^3$ of a 30% aqueous formaldehyde solution, 1 cm$^3$ of concentrated hydrochloric acid and 42 g of red phosphorus, having a mean particle size of 20 to 30$\mu$, are introduced into a 1 liter reactor.

The mixture is heated to 70° C. over the course of 30 minutes while stirring, and then to 90° C. for 1 hour. It is allowed to cool and then filtered, and the product is washed with acetone and then with ether and dried. 63.9 g of encapsulated red phosphorus powder are obtained.

Thereafter the procedure in Example 1 is followed.

An evolution of phosphine of 2.3 mg per gram of red phosphorus was obtained.

The following results are obtained by the LOI test: 25.5–26.

EXAMPLES 4 to 6

The treatments of Example 1 are carried out in an autoclave with the three sorts of coated red phosphorus, but 6 g of copper oxide are added in each test.

No evolution whatsoever of phosphine is found.

EXAMPLE 7

20 g of a polyamide, obtained by co-condensation of 50 molar parts of caprolactam, 30 molar parts of the condensation product of sebacic acid with hexamethylenediamine and 20 molar parts of the condensation product of adipic acid and hexamethylenediamine, are dissolved in 150 cm$^3$ of a mixture consisting of 20 parts by weight of water and 80 parts by weight of methanol. This copolyamide has a melting point of 150° C. and a mean molecular weight of 20,000.

30 g of a red phosphorus powder, having a mean particle size of 20 to 30μ, are added to the above solution, while stirring.

This suspension is poured into a vessel equipped with a turbine (stirrer) and containing 5 liters of acetone. The mixture is filtered and the product is rinsed twice with 200 cm$^3$ of ether and then dried at 50° C. 47.5 g of encapsulated red phosphorus are obtained.

Thereafter the process in an autoclave, as in Example 1, is carried out with 300 g of polyamide and 28.5 g of encapsulated red phosphorus. An evolution of phosphine of 5.2 mg per gram of red phosphorus was obtained. An index of 25.5 is obtained by the LOI test.

EXAMPLES 8 to 10

A single-screw laboratory extruder, in which the screw has a length of 415 mm and a diameter of 15 mm, is used. This extruder is equipped with a cylindrical die having a diameter of 3 mm. The barrel temperatures are as follows: 250° C. at the material inlet, 280° C. at the center and 270° C. at the die.

Compositions A, B and C, respectively containing 10 g, 9.13 g and 9.58 g of red phosphorus encapsulated according to Examples 1, 3 and 7, per 100 g of poly(hexamethylene adipamide), having a mean molecular weight of 20,000 and an inherent viscosity, in metacresol, of 1.3 and 2 g of copper oxide, are prepared by simple mixing.

These compositions are introduced into the extruder and strands are extruded.

During the entire operation, tests were conducted for the possible presence of phosphine in various parts of the extruder by means of a DRAEGER CH 31,101 tube. Similarly, attempts are made to detect phosphine when the strand which has just been extruded, and which is still hot, is broken.

Not a trace of phosphine is detected in any place.

EXAMPLE 11

A solution is prepared of 40 g of a phenol-formaldehyde Novolac containing 3% of hexamethylenetetramine (trade name RESOPHENE PB3 of RHONE-POULENC) in 150 ml of acetone. 60 g of red phosphorus powder having a mean particle size of 20 to 30μ are added while stirring. This dispersion is poured into a vessel, fitted with a degassing device and equipped with a turbine (stirrer), containing 1,500 ml of water heated to 50-60° C. The temperature is then raised to 90-100° C. for 30 minutes, with violent stirring. The mixture is filtered. 82.5 g of encapsulated red phosphorus are obtained.

66.5 g of poly(hexamethylene adipamide) containing 30% of glass fibers, 0.2 g of Cepretol (a polyalkylene glycol laurate), 0.75 g of copper oxide powder and 7.5 of encapsulated red phosphorus are compounded by simple mixing in a rotating drum.

A strand of good quality is extruded by means of an extruder, under the conditions described in Example 8, without detecting the slightest evolution of phosphine.

EXAMPLE 12

Compositions of plastics based on the following polymers are prepared using the phosphorus encapsulated according to Example 11:

(a) poly(tetramethylene glycol terephthalate) (3,500 poise)

(b) polypropylene, d=0.903, melting point 165-170° C., melt index=6 (at 230° C. under 2.16 kg. in g/10 minutes)

(c) polystyrene, d=1.05, Vicat temperature=96° C., melt index = 4-4.5 (at 200° C. under 5 kg).

In each experiment, 88 g of polymer a or b or c, 2 g of copper oxide powder and 10 g of encapsulated red phosphorus are mixed.

The composition is introduced into the extruder and strands are extruded. No traces of phosphine are detected in any place whatsoever.

The limiting oxygen index is measured in accordance with the LOI test; the following results are otained:

|  | Blank | with phosphorus |
|---|---|---|
| Polyterephthalate | 21 | 23.5 |
| Polypropylene | 17 | 19.5 |
| Polystyrene | 20 | 22 |

We claim:

1. Plastic based compositions flameproofed with 0.1% to 20% by weight, relative to the plastic, of red phosphorus in the form of particles having a mean diameter of less than 200 μ, and encapsulated in a polymer which does not have a melting point or softening point below 90° C. and has a mean molecular weight greater than 2,000 and in which the polymer is present in an amount within the range of 5 to 80% by weight of the red phosphorus.

2. Compositions as claimed in claim 1 which contain up to 100% by weight, relative to the coated phosphorus, of a metal oxide selected from the group consisting of the oxides of copper, zinc, silver, iron, antimony, magnesium, vanadium, tin and titanium.

3. Compositions as claimed in claim 1 in which the polymers encapsulating the red phosphorus particles are selected from the group consisting of the polycarbonates, the polyamides, the polyesters, the polyolefins, the polymers derived from acrylic acid or acrylates, the polytetrafluoroethylenes, the silicones, the polyimideamides, the phenolic resins, and the polyimides.

4. Compositions as claimed in claim 1 which include glass fibers as reinforcement.

5. Compositions as claimed in claim 1 which contain inert fillers.

6. Compositions as claimed in claim 5 in which the inert filler is selected from the group consisting of kaolin and talc.

* * * * *